United States Patent

Van Den Berg

[15] 3,705,138

[45] Dec. 5, 1972

[54] PROCESS FOR THE PREPARATION OF AMORPHOUS COPOLYMERS OF ETHYLENE

[72] Inventor: Cornelis E. P. V. Van Den Berg, Geleen, Netherlands

[73] Assignee: Stamicarbon N.V., Heerlen, Netherlands

[22] Filed: June 30, 1969

[21] Appl. No.: 837,885

[30] Foreign Application Priority Data

July 1, 1968    Netherlands..............6809302

[52] U.S. Cl............260/80.7, 260/80.78, 260/88.2 R
[51] Int. Cl.........C08f 15/40, C08f 17/00, C08f 1/56
[58] Field of Search..................260/88.2, 80.78, 80.7

[56] References Cited

UNITED STATES PATENTS

| | | | |
|---|---|---|---|
| 3,260,708 | 7/1966 | Natta et al. | 260/79.5 |
| 3,376,248 | 4/1968 | Kirkland | 260/33.6 |
| 3,518,237 | 6/1970 | Duck et al. | 260/80.78 |

*Primary Examiner*—James A. Seidleck
*Assistant Examiner*—Richard A. Gaither
*Attorney*—Cushman, Darby & Cushman

[57] ABSTRACT

A process for the preparation of amorphous copolymers of ethylene, one or more other $\alpha$-alkenes, and optionally one or more compounds containing more than one C   C bond, using a catalyst comprising an aluminum dihalide, a vanadium compound and an organo metal compound, the catalyst being dispersed in a liquid dispersing agent.

9 Claims, No Drawings

PROCESS FOR THE PREPARATION OF AMORPHOUS COPOLYMERS OF ETHYLENE

The invention relates to a process for the preparation of amorphous copolymers of ethylene with at least one other α-alkene or copolymers of ethylene, another α-alkene and one or more compounds with more than one C=C bond. The invention particularly relates to a process for the preparation of sulphurcurable amorphous copolymers of ethylene, one or more other α-alkenes, and one or more compounds containing at least two non-conjugated C=C bonds. It is well known that these copolymers can be prepared in a liquid dispersion agent using as catalysts for the reaction a vanadium compound and an organo-aluminum dihalide. By curing with sulphur, the copolymers obtained with this catalyst can be transformed into products possessing good mechanical properties.

The object of the invention is to provide an improvement to the process for producing such copolymers.

It has been found that the catalytic activity can be greatly increased by using a catalyst comprising a vanadium compound, an organo- aluminum halide, and an organic alkali metal compound in an amount not larger than 60 mole percent calculated on the amount of aluminum compound.

The invention consequently relates to a process for the preparation of amorphous copolymers by polymerization of ethylene, at least one other α-alkene and, if so desired, one or several compounds with more than one C=C bond, using a catalyst containing a vanadium compound and organo-aluminum dihalide, in a liquid dispersing agent, and an organic alkali metal compound in an amount not larger than 60 mole percent calculated on the amount of the aluminum compound.

α-alkenes that can be used as the monomer in addition to ethylene, are the α-alkenes containing from one to 12 carbon atoms, such as propylene, butene-1, pentene-1, hexene-1 octene-1, their branched isomers, such as 4methylpentene-1, styrene, α-methylstyrene, or mixtures of these compounds Particularly suited is propylene or propylene or propylene with butene-1.

The polyunsaturated compound may be any containing at least two C=C bonds and may be either aliphatic or alicyclic. The aliphatic polyunsatured compounds normally contain three to 20 carbon atoms, with the double bonds being either conjugated or non-conjugated. Examples of such compounds are: 1–3-butadiene, isoprene, 2,3-dimethyl butadiene 1–3, 2-ethyl butadiene 1 –3, piperylene, mycene, allene 1,2-butadiene, 1,4,9-decatrienes, 1–4-hexadiene, 1,5-hexadiene and 4-methyl hexadiene 1–4. The alicyclic polyunsaturated compounds, whether or not containing a bridge group, may be either monocyclic or polycyclic, and may contain one or several halogen atoms. Normally use can be made e.g. of the alkyl norbornadienes; the alkylidene norbornenes, in particular the 5-alkylidene norbornenes-2 in which the alkylidene group contains one to 20 and preferably one to eight carbon atoms, the alkenyl norbornenes, in particular the 5-alkenyl norbornenes-2 in which the alkenyl group contains three to 20 and preferably three to 10 carbon atoms, e.g. 5-(2′methyl-2′-butenyl) -norbornene-2 and 5-(3′methyl-2′-butenyl)-norbornene-2; 2 dicyclopentadiene and the polyunsaturated compounds of dicyclo (2,2,1)-heptane, dicyclo-(2,2,2)-octane, dicyclo-(3,2,1)-octane and dicyclo-(3,2,2)-nonane in which at least one of the rings is unsaturated. Further, compounds such as 4,7,8,9-tetra-hydroindene and isopropylidene tetrahydroindene may also be used. In particular, use is made of dicyclopentadiene, 5-methylene- or 5-ethylidiene norbornene-2 or hexadiene 1–4. Mixtures of the above- mentioned compounds may also be used.

Normally, only slight amounts (e.g. 0.5 –10 percent by weight) based on the total polymers of these polyunsaturated compounds need be incorporated in the amorphous polymer, to achieve adequate curing. Large amounts may also be used, however.

The organic group in the organo-aluminiumhalide used as the catalyst component may be an aryl, aralkyl or alkaryl group, but preference is given to an alkyl group, such as methyl, ethyl, propyl, isopropyl, n-butyl, isobutyl, hexyl or octyl. Very good results are obtained with monoethyl-aluminum dichloride. If desired, the organo-aluminum halide may contain a slight amount, e.g. up to 10 percent by weight, of a diorgano-aluminum halide. For the vanadium compound component in the catalyst, preference is given to a vanadium compound that is soluble in the dispersion agent used for the polymerization. In particular, $VOCl_3$ or $VOCl_4$, whether or not in combination with $TiCl_4$ may be used.

If desired, other substances may be added to the catalyst, such as slight amounts of a compound with free electron pairs, e.g. water, and alcohol, oxygen or Lewis bases.

The ratio between the aluminum compound and the vanadium compound may be varied within wide limits, e.g. between 1 : 1 and 100 : 1, but is preferably between 3 : 1 and 15 : 1. In the continuous realization of the process, the catalyst components, whether or not dissolved in a dispersing agent, are preferably directly supplied to the polymerization zone. The organic alkalimetal compound to be used as a component of the catalyst according to the invention, may be represented by the formula MR, where M denotes an alkali metal and R an alkyl group with one- 12 carbon atoms, a cyclo-alkyl group or an aryl group. Organic lithium compounds are especially useful and in particular, very good results are obtained with normal butyl lithium. Organo compounds of the other alkali metals, however, are also suitable. Even small amounts of the organic alkali metal compound, e.g. approximately 2 mole percent calculated on the amount of the aluminum compound, increase the activity of the catalyst. If more of the alkali metal compound is added, the activity usually increases to maximum after which with the addition of more of the alkali metal compound, a decrease sets in. The highest activity is achieved if the organic alkali metal compound is used in an amount of 10 –40 mole percent calculated to the amount of aluminum compound.

The copolymerization reaction is normally carried out at a temperature between −50°and +120° C, preferably between 10°and 50°C. The pressure will generally be between 1 and 50 atmospheres, but higher or lower pressures may also be used. Preferably, the process is carried out continuously. The dispersing agent may be any liquid that is inert to the catalyst, e.g., a more or less saturated aliphatic hydrocarbon such as butane, pentane, hexane, heptane or mineral oil fractions, aromatic hydrocarbons, such as benzene or toluene or halogenated aliphatic or aromatic hydrocarbons, such as tetrachloroethylene.

It is convenient to execute the process under such temperature and pressure conditions that one or several of the monomers used, particularly the α-alkene, e.g. propylene, will be present in so large a quantity that it will act as the dispersing agent. The process according to the invention can be carried out in a polymerization reactor filled with gas and liquid, but preferably in a reactor completely filled with liquid.

The molecular weight of the copolymers may normally be influenced by means of a so-called chain-controlling agent, e.g. acetylene. Hydrogen may be used advantageously in the process according to the invention, particularly if it is used in a polymerization reactor completely filled with liquid. Very small amounts of hydrogen have a sufficient effect on the molecular weight, but will be soluble in the polymerization medium, so that under the prevailing polymerization pressure and temperature conditions no gaseous hydrogen will be present in the polymerization reactor.

After the reaction is substantially complete, the copolymer is recovered from the reaction mixture obtained in the copolymerization. The recovery may be made with or without addition of water, steam or methanol; prior to this operation the catalyst may be deactivated, e.g. with water and alcohol or an acid.

The copolymer thus prepared may be admixed with the customary chemicals, such as zinc oxide, stearic acid, sulphur, anti-oxidants, vulcanization accelerators, e.g. tetramethyl thiuramdisulphide, tackifiers, dyes and pigments. If so desired, at least some of the additives may be present during the polymerization e.g. one or more anti-oxidants. The chemicals may be added as such, but is is preferred to distribute them in a liquid, or liquids, that are used as dispersing agents in the polymerization, and/or to disperse them in one or several of the liquid or liquified comonomers to be employed. Fillers such as whiting, kaolin and carbon black, and so-called extender oils, may also be added; if so desired, this may be done during the polymerization.

After being cured, the copolymers, whether or not mixed with other rubbers, such as butyl rubber or SBR, yield a product of excellent properties, which is suited for use in car tires. The copolymers may further be used in the production of bicycle tires, conveyor belts, footwear, flooring material and sealing strips.

The copolymers made by the process according to the invention can be vary readily vulcanized by heating them together with sulphur at 100°–250° C, preferably at 140°–170° C. Free radical sources, such as peroxides, may also be added, but this is not necessary.

If so desired, the copolymers obtained according to the invention may be processed to crumb, sheets, skeins, or bales.

The following examples serve to elucidate the invention, without restricting its scope in any way whatsoever. The intrinsic viscosity is measured in decalin at 135° C and at a concentration of 1 g of copolymer per litre.

EXAMPLE

Continuous and separate flows of 0.9 l/h of heptane containing the dissolved metal organic compounds, 0.9 l/h of heptane containing 0.45 mole of dissolved $VOCl_3$, and 0.2 l/h of heptane containing –moles of dissolved ethylidene norbornene were fed under moisture-and-oxygen-free condition to a metal reactor of 3 L capacity, with a water-cooled wall, and agitator, and feed and discharge apertures. Further, a continuous flow of a gas mixture consisting of 64 percent by volume of propylene, 27 percent by volume of ethylene, and 9 percent by volume of hydrogen was fed to the reactor. The feed rate was to chosen that not less than 50 percent of the gas issued from the reactor in unconverted form via a reflux condensor.

The reactor pressure was 1 at gauge, and the discharge rate was so adjusted that the volume of the polymer solution in the reactor was maintained at 1 litre. The polymerization temperature was about 25° C.

Variation in the amounts of the metal organic components gave the results listed in the table.

Prior to curing, 100 g of terpolymer were mixed with 5 g of ZnO, 1 g stearic acid, 50 g of HAF-carbon black, 1 g of Vulkacit Thiuram, 0.5 g of Vulkacit Mercapto and 1.5 g of sulphur. Further, all terpolymers, except the Mooney 39 terpolymer, were mixed with 25 g of oil (Cirocosol 42 XH). The mixture was cured at 160° C. The properties of the products are shown in the table.

TABLE

| Catalyst composition, mmole/l. | | | Yield, g./l. | Mooney ML-4 100° C. | Polymer composition, percent by weight | | | Properties of the cured rubber | | | | |
|---|---|---|---|---|---|---|---|---|---|---|---|---|
| Ethyl-aluminum dichloride | n.C$_4$H$_9$Li | VOCl$_3$ | | | Propylene | Ethylidene norbornene | Ethylene | Curing time, min. | Tensile strength, kg./cm.$^2$ | Elongation at rupture, percent | Permanent set, percent | 300% modulus, kg./cm.$^2$ |
| 2 | | 0.2 | 13 | 91 | 50 | 2.88 | 47.12 | 2.5 | 184 | 840 | 14 | 38 |
| | | | | | | | | 5 | 253 | 640 | 6 | 74 |
| | | | | | | | | 7.5 | 256 | 570 | 5 | 108 |
| | | | | | | | | 15 | 243 | 480 | 5 | 133 |
| 1.9 | 0.1 | 0.2 | 16 | 63 | 49 | 2.04 | 48.96 | 2.5 | 237 | 840 | 12 | 42 |
| | | | | | | | | 5 | 275 | 680 | 9 | 66 |
| | | | | | | | | 7.5 | 280 | 640 | 8 | 83 |
| | | | | | | | | 15 | 268 | 530 | 6 | 106 |
| 1.8 | 0.2 | 0.2 | 29 | 68 | 51 | 1.14 | 47.86 | 2.5 | 235 | 890 | 13 | 31 |
| | | | | | | | | 5 | 257 | 700 | 9 | 56 |
| | | | | | | | | 7.5 | 280 | 650 | 8 | 70 |
| | | | | | | | | 15 | 264 | 570 | 5 | 92 |
| 1.6 | 0.4 | 0.2 | 34 | 76 | 49 | 1.38 | 49.62 | 2.5 | 238 | 830 | 12 | 33 |
| | | | | | | | | 5 | 263 | 700 | 8 | 53 |
| | | | | | | | | 7.5 | 284 | 630 | 7 | 71 |
| | | | | | | | | 15 | 249 | 560 | 5 | 94 |
| 1.4 | 0.6 | 0.2 | 21.5 | 39 | 46 | 2.10 | 51.90 | 2.5 | 255 | 730 | 17 | 70 |
| | | | | | | | | 5 | 249 | 510 | 9 | 113 |
| | | | | | | | | 7.5 | 262 | 510 | 9 | 138 |
| | | | | | | | | 15 | 256 | 430 | 6 | 171 |

What is claimed is:

1. A process for the preparation of amorphous copolymers by polymerization of ethylene, at least one member selected from the group consisting of at least one other alpha-alkene having up to 12 carbon atoms, and at least one polyunsaturated hydrocarbon compound having up to 20 carbon atoms and more than one C = C bond, in the presence of a catalytic amount of a catalyst dispersed in a liquid dispersing agent, said catalyst consisting essentially of an organo-aluminum dihalide, a vanadium compound soluble in said liquid dispersing agent, and an organo-alkali metal compound, said organo-alkali compound being present in an amount of from about 2 mole percent up to 60 mole percent, based on the amount of aluminum compound.

2. Process according to claim 1, wherein the organic alkali metal compound is an organic lithium compound.

3. Process according to claim 2, wherein the organic lithium compound is normal butyl lithium.

4. Process according to claim 1 wherein the organic alkali metal compound is present in an amount of 10–40 mole percent based on the amount of the aluminum compound.

5. A process according to claim 1 wherein the $\alpha$-alkene is selected from the group consisting of propylene, butene-1, pentene-1, hexene-1, octene-1, 4-methylpentene-1, styrene, $\alpha$-methyl-styrene, and the polyunsaturated hydrocarbon compound is selected from the group consisting of 1-3-butadiene, isoprene, 2,3-dimethyl butadiene, 1-3,2-ethyl butadiene-1-3, piperylene, myrcene, allene, 1,2-butadiene, 1,4,9-decatrienes, 1-4-hexadiene, 1,5-hexadiene, 4-methyl hexadiene-1-4, alkyl norbonadiene, alkylidene norbornenes in which the alkylidene group contains up to 20 carbon atoms, alkenyl norberrenes in which the alkenyl group contains up to 20 carbon atoms, dicyclo (2,2,0)-heptane, dicyclo-(2,2,2)-octane, dicyclo-(3,2,1)-octane, dicyclo-(3,2,2)-nonane, 4,7,8,9-tetrahydroindene, isopropylidene tetrahydroindene, dicyclopentadiene and hexadiene 1-4.

6. The process according to claim 1, wherein said vanadium compound is $VOCl_3$ or $VOCl_4$.

7. The process according to claim 1, wherein said organoaluminum dihalide is mono-ethyl-aluminum dichloride.

8. The process according to claim 1 wherein the ratio between said aluminum compound and said vanadium compound is between 1:1 and 100:1.

9. The process according to claim 8 wherein said ratio is between 3:1 and 15:1.

* * * * *